US008706335B2

(12) United States Patent
Kuberczyk

(10) Patent No.: US 8,706,335 B2
(45) Date of Patent: Apr. 22, 2014

(54) METHOD FOR OPERATING A HYBRID DRIVE UNIT AND DEVICE FOR CONTROLLING A HYBRID DRIVE UNIT

(75) Inventor: Raffael Kuberczyk, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 112 days.

(21) Appl. No.: 13/334,140

(22) Filed: Dec. 22, 2011

(65) Prior Publication Data

US 2012/0179317 A1 Jul. 12, 2012

(30) Foreign Application Priority Data

Jan. 12, 2011 (DE) .......................... 10 2011 002 541

(51) Int. Cl.
*B60W 20/00* (2006.01)

(52) U.S. Cl.
CPC ....... *B60W 20/1082* (2013.01); *B60W 20/1088* (2013.01); *Y10S 903/902* (2013.01); *Y10S 903/93* (2013.01)
USPC .............................. 701/22; 903/902; 903/930

(58) Field of Classification Search
CPC ... B60W 20/00; B60W 20/10; B60W 20/108; B60W 20/1082; B60W 20/1088
USPC .............................. 701/22; 903/902, 906, 930
See application file for complete search history.

(56) References Cited

U.S. PATENT DOCUMENTS

| 6,570,265 | B1 * | 5/2003 | Shiraishi et al. ............ 290/40 C |
| 7,520,353 | B2 * | 4/2009 | Severinsky et al. ........ 180/65.28 |
| 8,250,864 | B2 * | 8/2012 | Pott et al. ........................ 60/601 |
| 8,419,590 | B2 * | 4/2013 | Falkenstein ...................... 477/3 |
| 2003/0085577 | A1 * | 5/2003 | Takaoka et al. ............. 290/40 C |
| 2006/0086546 | A1 * | 4/2006 | Hu et al. ....................... 180/65.2 |
| 2007/0205029 | A1 * | 9/2007 | Leone et al. ................. 180/65.2 |
| 2007/0254776 | A1 * | 11/2007 | Wakashiro et al. ........... 477/181 |
| 2007/0266711 | A1 | 11/2007 | Falkenstein et al. |
| 2007/0278021 | A1 * | 12/2007 | Pott et al. ..................... 180/65.2 |
| 2011/0005850 | A1 * | 1/2011 | Colvin et al. .............. 180/65.28 |
| 2011/0165993 | A1 * | 7/2011 | Stoffels et al. .................. 477/15 |
| 2011/0172862 | A1 * | 7/2011 | Ortmann et al. ................ 701/22 |
| 2012/0035793 | A1 * | 2/2012 | Kang et al. ...................... 701/22 |
| 2012/0190498 | A1 * | 7/2012 | Stoffels et al. .................... 477/5 |
| 2013/0096752 | A1 * | 4/2013 | Severinsky et al. ............ 701/22 |
| 2013/0096753 | A1 * | 4/2013 | Severinsky et al. ............ 701/22 |
| 2013/0253747 | A1 * | 9/2013 | Amano ........................... 701/22 |

FOREIGN PATENT DOCUMENTS

| DE | 10 2004 044 507 A1 | 3/2006 |
| DE | 10 2005 008 156 A1 | 9/2006 |
| DE | 10 2009 001 297 A1 | 9/2010 |

* cited by examiner

*Primary Examiner* — John Q Nguyen
*Assistant Examiner* — Michael Whalen
(74) *Attorney, Agent, or Firm* — Davis&Bujold, PLLC; Michael J. Bujold

(57) ABSTRACT

A method for operating a hybrid unit comprising a first drive-power source, such as a supercharged internal combustion engine, and a second drive-power source, such as an electric machine. The second drive-power source operates as a generator for charging the energy accumulator and as a motor for discharging of the energy accumulator. Depending on torque desired by a driver, drive torque can be called for, on the one hand, from the first drive-power source and, on the other hand, from the second drive-power source operating as a motor. When the torque desired by the driver increases, to ensure operation of the hybrid unit with reduced fuel consumption and reduced emissions, depending on the charge condition of the energy accumulator, torque demanded from the first drive-power source is delayed and/or reduced, and the resulting reduced dynamic response is compensated for by demanding torque from the second drive-power source.

7 Claims, 2 Drawing Sheets

METHOD FOR OPERATING A HYBRID DRIVE UNIT AND DEVICE FOR CONTROLLING A HYBRID DRIVE UNIT

This application claims priority from German patent application serial no. 10 2011 002 541.3 filed Jan. 12, 2011.

FIELD OF THE INVENTION

The invention concerns a method for operating a hybrid drive unit. Furthermore, the invention concerns a device for controlling a hybrid drive unit.

BACKGROUND OF THE INVENTION

To reduce fuel consumption and exhaust emissions, the use of hybrid drives in motor vehicles is increasing. A hybrid drive unit comprises a first drive-power source in the form of an internal combustion engine or combustion motor, and a second drive-power source preferably in the form of an electric machine. The second drive-power source co-operates with an energy accumulator, which is more predominantly charged when the second drive-power source is operating as a generator and more predominantly discharged when the second drive-power source is operating as a motor. The energy accumulator can be for example an electric energy accumulator, a mechanical energy accumulator such as a flywheel mass accumulator, or even a hydraulic energy accumulator.

SUMMARY OF THE INVENTION

The present invention now concerns a method for operating a hybrid drive unit and a device for controlling such a hybrid drive unit, in which the first drive-power source is designed as a supercharged internal combustion engine, for example an exhaust turbocharged diesel engine or an exhaust turbocharged Otto engine. By virtue of the present invention, with such a hybrid drive unit, in the event of a spontaneous or transient torque demand by a driver, an operating mode of the hybrid that reduces fuel consumption and emissions is ensured.

Starting from there, the purpose of the present invention is to provide a new type of method for operating a hybrid drive unit and a new type of device for controlling a hybrid drive unit.

According to the invention, when the torque called for by the driver is increased, then to ensure an operating mode of the hybrid drive unit that reduces fuel consumption and emissions, as a function of the charge condition of the energy accumulator the torque demanded from the first drive-power source, namely the supercharged internal combustion engine, is delayed and/or reduced whereas the dynamic response reduction due to this is compensated by a torque demand from the second drive-power source, which is preferably in the form of an electric machine. Thus, in the event of a spontaneous or transient torque demand or increase of the torque called for by the driver, the hybrid drive unit can be operated in a fuel consumption and emissions reducing manner without worsening or reducing the dynamic response.

In a first advantageous further development, when the charge condition of the energy accumulator is relatively high the torque demanded from the first drive-power source is delayed and/or reduced in such manner that if the torque called for by the driver is increased stepwise or abruptly, the torque demanded from the first drive-power source is first increased abruptly or with the maximum time gradient, at most to the maximum torque that can be provided by a normally aspirated engine without supercharge, then the torque demanded from the first drive-power source is kept approximately constant, and thereafter the torque demanded from the first drive-power source is increased steadily and relatively rapidly to the torque desired by the driver. According to a second advantageous further development alternative to the first advantageous further development, when the charge condition of the energy accumulator is relatively high the torque demanded from the first drive-power source is delayed and/or reduced in such manner that if the torque called for by the driver is increased stepwise or abruptly, the torque demanded from the first drive-power source is increased steadily and relatively rapidly to the torque desired by the driver. With these two further developments of the method, when the charge condition of the energy accumulator is relatively high, a very substantial absolute reduction of emissions can be ensured. By virtue of these advantageous further developments, the torque demanded from the first drive-power source, namely from the supercharged internal combustion engine, is relatively markedly reduced and/or slowed up or made more sluggish and, by a correspondingly high torque demand from the second drive-power source, the energy accumulator co-operating with the latter is relatively briskly discharged.

Preferably, when the charge condition of the energy accumulator is relatively low the torque demanded from the first drive-power source is delayed and/or reduced in such manner that if the torque called for by the driver is increased stepwise or abruptly, the torque demanded from the first drive-power source is first increased abruptly or with the maximum time gradient, at most to the maximum torque that can be provided by a normally aspirated engine without supercharge, and then the torque demanded from the first drive-power source is increased steadily and relatively slowly to the torque desired by the driver. By operating the hybrid drive unit in this way, when the charge condition of the energy accumulator is relatively low, then with regard to the energy supplied to the drive-train by the second drive-power source a substantial specific reduction of emissions can be achieved or provided.

If the supercharged internal combustion engine is an exhaust turbo-supercharged diesel engine, the torque demand is adjusted at a combustion air to fuel ratio $\lambda \gg 1$ for the diesel engine, and for the subsequent brisk charging of the energy accumulator with the second drive-power source operating as a generator the diesel engine is operated in a partially homogeneous or homogeneous operating mode. Thus, with an internal combustion engine in the form of an exhaust turbo-supercharged diesel engine it can be ensured that the energy accumulator co-operating with the second drive-power source is charged in an emissions-reducing manner. When the diesel engine is operating partially homogeneously or homogeneously, it produces relatively low emissions.

If the supercharged internal combustion engine is an exhaust turbo-supercharged Otto engine with pre-mixing of the combustion air and fuel, the torque demand is adjusted with the Otto engine running in the stratified mode in which it is operated with a combustion air to fuel ratio $\lambda \gg 1$, whereas for the subsequent brisk charging of the energy accumulator when the second drive-power source is operating as a generator, an operating point displacement or shift of the Otto engine is carried out in order to operate the Otto engine with a combustion air to fuel ratio $\lambda=1$ while the second drive-power source is operating as a generator.

Thus, with an internal combustion engine in the form of an exhaust turbo-supercharged Otto engine, it is also possible subsequently to charge the energy accumulator with low emissions from the Otto engine. When an exhaust turbo-supercharged Otto engine is running with a combustion air to fuel ratio λ=1, its emissions are relatively low.

BRIEF DESCRIPTION OF THE DRAWINGS

Example embodiments of the invention, to which it is not limited, are explained in more detail with reference to the drawings, which show.

DETAILED DESCRIPTION OF THE PREFERRED EMBODIMENTS

Figure 1:
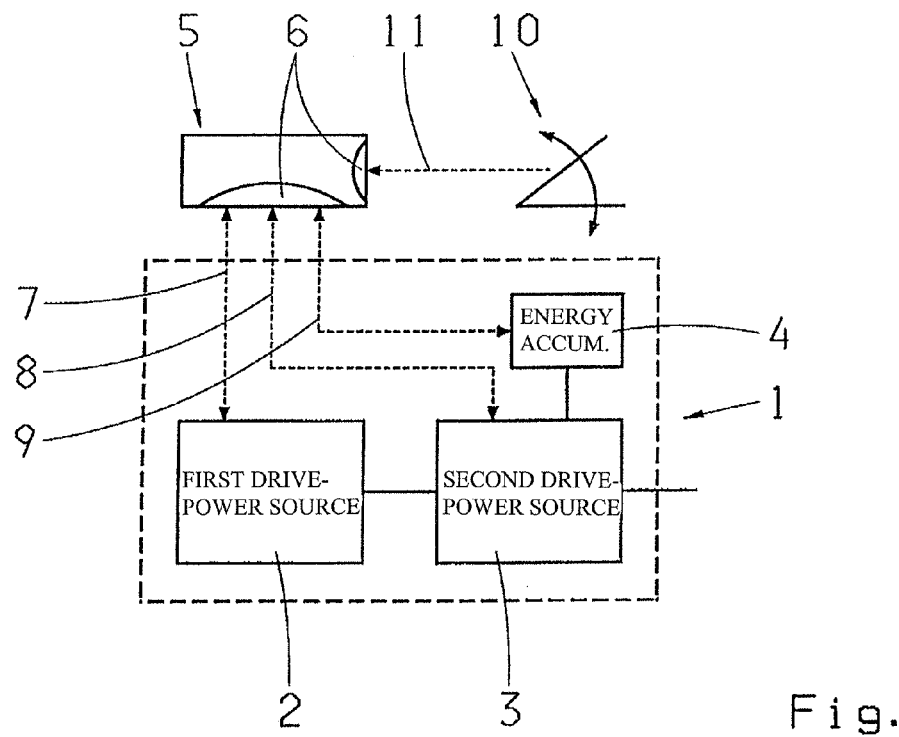
FIG. 1: Schematic representation of a hybrid unit with a control device according to the invention.

FIG. 1 shows a very schematic representation of a hybrid drive unit 1 comprising as its first drive-power source 2 a supercharged internal combustion engine and as its second drive-power source 3 an electric machine. An energy accumulator 4, preferably an electrical energy accumulator, co-operates with the second drive-power source 3. The energy accumulator 4 can also be a mechanical energy accumulator such as a flywheel mass accumulator, or a hydraulic energy accumulator.

The hybrid drive unit 1 is associated with a control device 5 to control or regulate the operation of the hybrid drive unit, the control device 5 exchanging data with the first drive-power source 2, the second drive-power source 3 and the energy accumulator 4 via a data interface 6 in accordance with the dotted arrows 7, 8 and 9.

Thus, in accordance with the arrow 7 the control device 5 exchanges data with the first drive-power source 2 in the form of a supercharged internal combustion engine. In addition the control device 5 exchanges data with the second drive-power source 3 preferably consisting of an electric machine in accordance with the arrow 8, and with the energy accumulator 4 in accordance with the arrow 9.

FIG. 1 also shows an accelerator pedal 10 by means of which a driver can specify a desired torque by actuating the pedal, actuation of the accelerator pedal 10 by the driver also being communicated to the control device 5 via the interface 6 in accordance with the arrow 11.

During operation of the hybrid drive unit a torque desired by the driver, which the driver indicates by actuating the accelerator pedal 10, can be supplied to a drive output on the one hand by the first drive-power source 2 or supercharged internal combustion engine, and on the other hand by the second drive-power source 3, in particular the electric machine. When the second drive-power source 3 is being operated as a motor, it supplies drive torque to the drive output with predominant discharging of the energy accumulator 4. In contrast, when the second drive-power source 3 is operating as a generator, it serves predominantly to charge the energy accumulator 4 and the drive-power source 3 then provides no drive torque for the drive output.

As already mentioned, the first drive-power source 2 is a supercharged internal combustion engine or supercharged combustion motor. For an internal combustion engine in the form of an exhaust turbo-charged Otto engine with intake manifold and direct injection, FIG. 2 shows, as a function of the rotational speed $n_{VM}$ of the combustion motor or internal combustion engine, the torque $M_{VM}$ that it can deliver.

Figure 2:
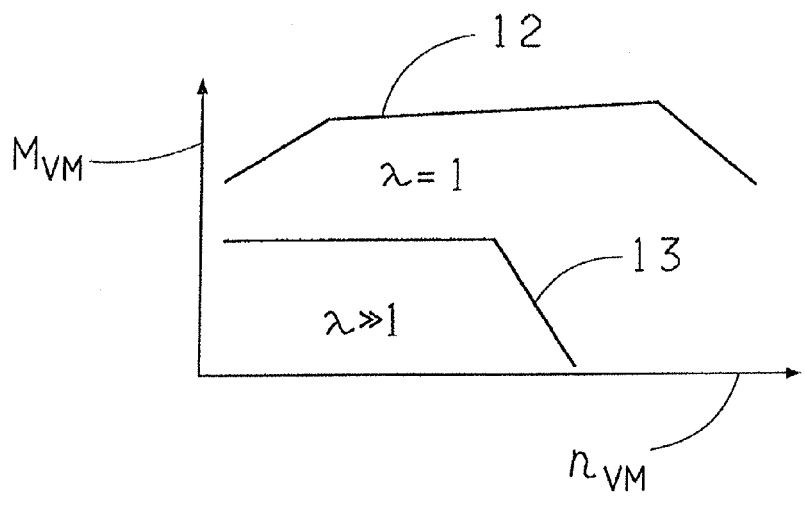
FIG. 2: A diagram to make clear the operation of an Otto engine with pre-mixing of the combustion air and fuel.

FIG. 2 shows plots of two characteristic curves 12, 13, namely a first characteristic curve 12 that corresponds to the full-load performance of the supercharged internal combustion engine or supercharged combustion motor, and a second characteristic curve 13 that separates the so-termed quantitative load regulation operating range λ=1 of the combustion motor or internal combustion engine 2 from its so-termed stratified combustion operating range (λ» 1).

In the so-termed quantitative load regulation operating range of the combustion motor 2 the combustion motor, consisting of an Otto engine, is operated with a combustion air to fuel ratio λ=1. In contrast, in the stratified combustion operating range of the combustion motor consisting of an Otto engine, the combustion air to fuel ratio is λ» 1.

In the so-termed stratified combustion operating range λ» 1 in an Otto engine, the fuel is introduced into the cylinder thereof in such a way that the fuel is distributed nonhomogeneously in the cylinder, namely in such manner that the fuel is introduced exclusively in the area of the spark plugs of the cylinder and is combusted there, so that accordingly an excess of combustion air predominates within the cylinder. This stratified combustion operating range of an Otto engine is particularly advantageous when the engine is operating under partial load, in order to reduce throttle losses that occur during the quantitative load regulation operating range λ=1.

In the context of the present invention it is now proposed that if the driver actuates the accelerator pedal 10 so as to increase the torque desired, then to ensure fuel consumption reducing and emissions reducing operation of the hybrid drive unit 1, depending on the charge condition of the energy accumulator 4, torque demanded from the first drive-power source 2, i.e. torque demanded from the supercharged internal combustion engine, is delayed and/or reduced and the consequently reduced dynamic response of the combustion motor or internal combustion engine 2 is compensated for by torque demanded from the second drive-power source 3, which is preferably an electric machine.

If the supercharged internal combustion engine is an exhaust turbo-supercharged Otto engine with intake manifold and direct injection, this delay and/or reduction of the torque demanded from the combustion motor 2 and its compensation by the second drive-power source 3 take place, in particular, exclusively in the stratified combustion operating range of the Otto engine, in which it is operated with a combustion air to fuel ratio λ»1 in order, in the event of a spontaneous or transient torque demand increase by the driver, to ensure optimum fuel consumption reduction and emissions reduction.

Figure 3:
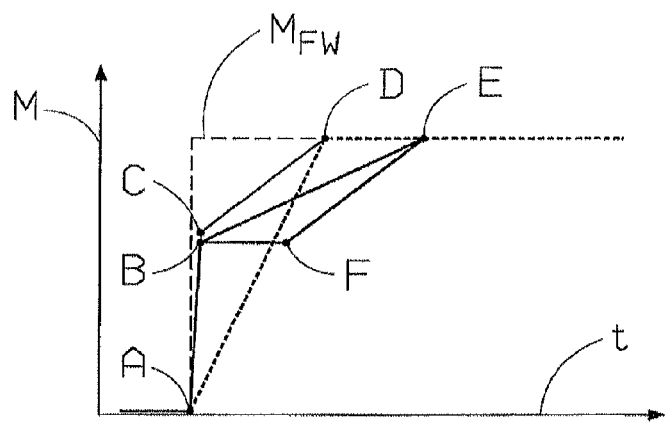
FIG. 3: A first diagram to make clear the method according to the invention and the operation method of the control device according to the invention.

Further details regarding the delay and/or reduction of the torque demanded from the first drive-power source 2, namely the supercharged internal combustion engine, emerge from FIG. 3 in which, in the event of a stepwise or abrupt increase of the torque $M_{FW}$ desired by the driver, various torque demands on the first drive-power source 2 or supercharged internal combustion engine are shown as a function of the time t.

According to the prior art, in the event of an abrupt or stepwise increase of the torque $M_{FW}$ called for by the driver from a supercharged internal combustion engine, a torque demand would be produced which would follow the course defined by the points A, C, D and E. Point C corresponds to the maximum torque that can be delivered by a normally aspirated internal combustion engine or combustion motor without supercharging. Points D and E coincide with the torque $M_{FW}$ desired by the driver. Accordingly, in the prior art, in the event of a stepwise or abrupt increase of the driver's desired torque $M_{FW}$, the torque demanded from the first drive-power source 2 or internal combustion engine would first be increased abruptly or with maximum time gradient to the maximum torque that could be delivered by normal aspiration without supercharging (point C in FIG. 3), and then the torque demanded from the first drive-power source 2, i.e. the supercharged internal combustion engine, starting from this maximum torque (point C) that could be delivered in this normally aspirated manner without supercharging, would be increased as rapidly as possible with a relatively steep time gradient to the torque $M_{FW}$ desired by the driver (point D) and would thereafter be kept constant.

In contrast to the above, if the charge condition of the energy accumulator 4 is relatively high, then according to a further development of the present invention the torque demanded from the first drive-power source 2, i.e. the supercharged internal combustion engine or supercharged combustion motor, is delayed and/or reduced in such manner that if the torque $M_{FW}$ desired by the driver is increased stepwise or abruptly, the torque demanded from the first drive-power source 2 or supercharged internal combustion engine is first increased abruptly or with maximum time gradient, at most to the maximum torque that can be delivered by a normally aspirated engine without supercharging, preferably to a torque (point B in FIG. 3) which is lower than the maximum torque that can be delivered with normal aspiration without supercharging (point C). As shown in FIG. 3, according to this advantageous further development of the invention the torque demanded from the internal combustion engine 2 is first increased abruptly or with maximum time gradient to a torque value (point B) which is below the maximum torque that can be delivered by normal aspiration (point C). Then the torque demanded from the first drive-power source 2, i.e. from the supercharged internal combustion engine, is held approximately constant for a defined time (until point F), and after this the torque demanded from the first drive-power source is increased steadily and relatively rapidly up to the torque $M_{FW}$ desired by the driver (defined by the points F and E in FIG. 3).

Thus, in this advantageous further development of the invention, if the charge condition of the electrical energy accumulator is relatively high, in the event of a stepwise or abrupt increase of the torque $M_{FW}$ desired by the driver the torque demanded from the first drive-power source 2, i.e. from the supercharged internal combustion engine, is defined by the points A, B, F and E.

According to an alternative advantageous further development of the method according to the invention, if the charge condition of the energy accumulator 4 is relatively high the torque demanded from the first drive-power source 2 is delayed and/or reduced in such manner that in the event of a stepwise or abrupt increase of the torque $M_{FW}$ called for by the driver, the torque demanded from the first drive-power source 2 is increased steadily and relatively rapidly to the torque desired by the driver (points A, and D in FIG. 3) whereas, however, this time gradient is smaller that the maximum time gradient for increasing the torque demanded from the first drive-power source 2.

Thus, in this second alternative further development of the invention, if the torque $M_{FW}$ desired by the driver is increased stepwise or abruptly, the torque demanded from the first drive-power source 2 is defined or determined by the points ADE in FIG. 3.

Figure 4:
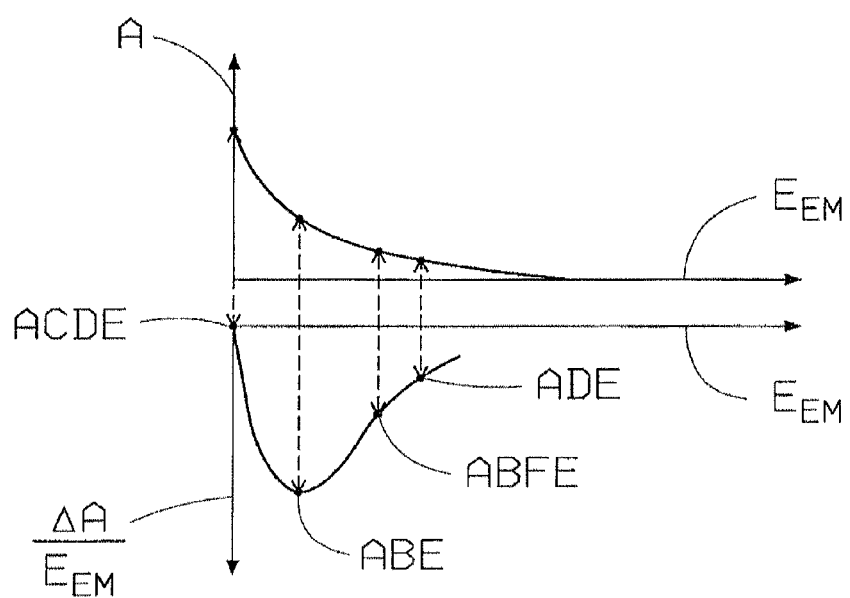
FIG. 4: A second diagram to make clear the method according to the invention and the operation method of the control device according to the invention.

As already explained, the delay and/or reduction of the torque demanded from the first drive-power source 2 or supercharged internal combustion engine is compensated by a torque demand from the second drive-power source 3 preferably consisting of an electric machine. In FIG. 4 are plotted, by virtue of an energy input $E_{EM}$ by the second drive-power source 3 to the drive-train due to the torque demanded from the second drive-power source 3, on the one hand an absolute emissions output A of the hybrid drive unit 1, namely of the first drive-power source 2 thereof, and on the other hand a specific emissions saving $\Delta A/E_{EM}$ related to the energy input $E_{EM}$ by the second drive-power source 3.

Thus, FIG. 4 shows that by virtue of the torque demands specified when the charge condition of the energy accumulator 4 is relatively high, i.e. by virtue of the torque demands corresponding to points ABFE or ADE, on the one hand a relatively large amount of energy $E_{EM}$ is imparted to the drive output, but also the absolute emissions A can be markedly reduced. However, the specific exhaust gas emissions reduction $\Delta A/E_{EM}$ related to the energy input $E_{EM}$ by the electric machine 3 is in each case relatively small.

When the charge condition of the energy accumulator 4, is relatively low, the torque demanded from the first drive-power source 2, namely the supercharged internal combustion engine, is delayed and/or reduced in such manner that in the event of a stepwise or abrupt increase of the torque $M_{FW}$ desired by the driver, the torque demanded from the first drive-power source 2 is first increased abruptly or with maximum gradient at most to the maximum torque that can be delivered by normal aspiration without supercharging (point B in FIG. 3), and then the torque demanded from the first drive-power source is increased steadily but slowly to the torque $M_{FW}$ desired by the driver, i.e. with a relatively low time gradient. In FIG. 3 this is defined by the points B and E.

FIG. 4 shows that with a torque demanded from the first drive-power source 2 which is defined by the points ABE, when considered in absolute terms the emissions A can only be reduced by a small amount, but a relatively large specific exhaust gas reduction $\Delta A/E_{EM}$ can be achieved.

As already explained, the torque demands according to the invention are used by the control device 5 as a function of the charge condition of the energy accumulator 4 in the case of an exhaust turbo-supercharged Otto engine with inlet manifold and direct injection during stratified operation of the Otto engine, i.e. when it is operated with a combustion air to fuel ratio $\lambda \gg 1$ under partial load. If the charge condition of the energy accumulator 4 is relatively high the torque demanded from the first drive-power source 2 is chosen in accordance with the curves ABFE or ADE, whereas in contrast, when the charge condition of the energy accumulator 4 is relatively low, the control device 5 specifies a torque demand from the first drive-power source 2 in accordance with the curve ABE. The reduction of the torque demanded from the first drive-power source 2 is compensated by a corresponding torque demand from the second drive-power source 3.

When the energy accumulator 4 subsequently has to be charged again, in the case of an exhaust turbo-supercharged Otto engine with pre-mixing of the combustion air and fuel, to charge the energy accumulator 4 by operating the second drive-power source 3 as a generator an operating point displacement or shift of the Otto engine is carried out such that during generator operation of the second drive-power source 3 the Otto engine is operated with a combustion air to fuel ratio $\lambda=1$, i.e. in a quantitative load regulation range. For an operating point displacement, the torque delivered by the first drive-power engine 2, i.e. by the supercharged internal combustion engine, is increased so that at approximately the same speed of the first drive-power source 2, i.e. the supercharged internal combustion engine, its operating point is shifted from the stratified combustion operation range to the quantitative load regulation range. When the operating range of the first drive-power source 2 is shifted, the torque it delivers remains approximately unchanged, and is only increased by the generator torque uptake of the second drive-power source 3 operating as a generator.

The invention should be used with exhaust turbo-supercharged Otto engines having inlet manifold injection and also exhaust turbo-supercharged Otto engines having direct fuel injection, which can be operated over all operating points or operating ranges with a combustion air to fuel ratio $\lambda=1$.

Furthermore, exhaust turbo-supercharged Otto engines with direct fuel injection can also be operated with $\lambda \gg 1$ (stratified operation).

Likewise, the invention can also be used when the first drive-power source 2 of the hybrid drive unit 1 is in the form of an exhaust turbo-supercharged diesel engine which operates over all operating points or operating ranges with a combustion air to fuel ratio $\lambda \gg 1$. In this case, for the subsequent charging of the energy accumulator 4 the diesel engine is operated in a so-termed partially homogeneous or homogeneous mode (HCCI operation), in order to charge the energy accumulator 4 by operating the second drive-power source 3 as a generator with the lowest possible emissions from the diesel engine 2.

The method according to the invention is implemented by the control device 5 or the implementation of the method is controlled and/or regulated by the control device 5. For this purpose the control device 5 exchanges data directly, or indirectly via an interposed further control unit, with the first drive-power source 2, the second drive-power source 3, the energy accumulator 4 and the accelerator pedal 10. In the manner described above and as a function of the charge condition of the energy accumulator 4, when an increase of the torque desired by the driver is detected with reference to the accelerator pedal 10, then in order to ensure fuel consumption-reduced and emissions-reduced operation of the hybrid drive unit 1 the control device 5 adjusts the torque demanded from the first drive-power source 2 and compensates for the consequently reduced dynamic response by demanding torque from the second drive-power source 3. In addition, in the manner described above the control device 5 controls and/or regulates the subsequent charging of the energy accumulator 4.

INDEXES

1 Hybrid drive unit
2 First drive-power source/supercharged internal combustion engine
3 Second drive-power source
4 Energy accumulator
5 Control device
6 Interface
7 Data
8 Data
9 Data
10 Accelerator pedal
11 Data
12 Characteristic curve
13 Characteristic curve

The invention claimed is:

1. A method of operating a hybrid drive unit (1) comprising a first drive-power source (2), in the form of a supercharged internal combustion engine, and a second drive-power source (3), comprising an electric machine which is operable as a generator for charging an energy accumulator (4) that co-operates therewith and as a motor for discharging the energy accumulator (4), such that as a function of an output torque desired by a driver, a first drive torque can be called for from the first drive-power source (2) and a second drive torque called for from the second drive-power source (3) operating as a motor, the method comprising the steps of:
   when the driver indicates a desire for an increased output torque, one of:
      (a) increasing a time span during which the first drive torque reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and
      (b) decreasing a slope of an initial torque increase by which the first drive torque reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and
   supplementing the first drive torque with the second drive torque to achieve the increased output torque and compensate for the increased time span during which the first drive torque reaches the increased output torque desired by the driver or the decreased slope of an initial torque increasing by which the first drive torque reaches the increased output torque desired by the driver when the charge condition of the energy accumulator (4) is high, such that if the increased output torque desired by the driver is increased either stepwise or abruptly, the first drive torque demanded from the first drive-power source (2) is increased with a substantially constant slope to the increased output torque desired by the driver (A to D), at a torque time gradient less than that of a maximum initial time gradient (A to C) that is deliverable by normal engine aspiration without supercharging.

2. The method according to claim 1, wherein the first drive-power source (2) is an exhaust turbo-supercharged diesel engine, and the method further comprising the step of adjusting the torque demand with a combustion air to fuel ratio greater than and not substantially equal to one ($\lambda \gg 1$) for the diesel engine, and for subsequent charging of the energy accumulator (4) by operating the second drive-power source (3) as a generator, operating the diesel engine (2) in either a partially homogeneous or a homogeneous mode.

3. The method according to claim 1, wherein the first drive-power source (2) is an exhaust turbo-supercharged Otto engine with pre-mixing of the combustion air and fuel further, the method further comprising the step of adjusting the torque demand during stratified operation of the Otto engine in which the engine is operated with a combustion air to fuel ratio greater than and not substantially equal to ($\lambda \gg 1$), and for subsequent charging of the energy accumulator (4) by operating the second drive-power source (3) as a generator, carrying out one of an operating point displacement or a shift of the Otto engine in order to operate the Otto engine, while the second drive-power source (3) is operating as a generator, with a combustion air to fuel ratio equal to one ($\lambda=1$).

4. The method according to claim 1, wherein the first drive-power source (2) is an exhaust turbo-supercharged Otto engine with direct fuel injection, the method further comprising the step of adjusting the torque demand with a combustion air to fuel ratio equal to one ($\lambda=1$) for the Otto engine.

5. A device (5) for controlling a hybrid drive unit (1), which exchanges data, either directly or indirectly, via an interposed further control unit, with a hybrid drive unit (1) comprising a first drive-power source (2), in the form of a supercharged internal combustion engine, and a second drive-power source (3) comprising an electric machine, with an energy accumulator (4) which co-operates with the second drive-power source, and an accelerator pedal (10), to ensure operation of the hybrid drive unit (1) with reduced fuel consumption and reduced emissions, if the accelerator pedal (10) indicates that output torque desired by the driver is increased, as a function of a charge condition of the energy accumulator (4), the control device (5) at least one of (a) increases a time span during which a first drive torque, demanded from and supplied by the first drive-power source (2), reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and (b) decreases a slope of an initial torque increase by which the first drive torque reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and supplementing the first drive torque with a second drive torque, supplied by the second drive-power source (3), to achieve the increased output torque and compensate for the increased time span during which the first drive torque reaches the increased output torque desired by the driver or the decreased slope of an initial torque increasing by which the first drive torque reaches the increased output torque desired by the driver when the charge condition of the energy accumulator (4) is high, such that if the increased output torque desired by the driver is increased either stepwise or abruptly, the first drive torque demanded from the first drive-power source (2) is increased with a substantially constant slope to the increased output torque desired by the driver (A to D), at a torque time gradient less than that of a maximum initial time gradient (A to C) that is deliverable by normal engine aspiration without supercharging.

6. A control device (5) for controlling a hybrid drive unit (1), which exchanges data, either directly or indirectly, via an interposed further control unit, with a hybrid drive unit (1) comprising a first drive-power source (2) in the form of a supercharged internal combustion engine and a second drive-power source (3) consisting of an electric machine, with an energy accumulator (4) which co-operates with the second drive-power source, and an accelerator pedal (10), for ensuring operation of the hybrid drive unit (1) with reduced fuel consumption and reduced emissions, if the accelerator pedal (10) indicates that torque desired by the driver has been increased, as a function of a charge condition of the energy accumulator (4), the control device (5) at least one of (a) increases a time span during which a first drive torque, demanded from and supplied by the first drive-power source (2), reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and (b) decreases a slope of an initial torque increase by which the first drive torque reaches the increased output torque desired by the driver in comparison to a first drive torque normally achieved by the supercharged internal combustion engine, in a non-supercharged aspiration to achieve operation of the hybrid unit (1) with reduced fuel consumption and reduced emissions; and supplementing the first drive torque with a second drive torque, supplied by the second drive-power source (3), to achieve the increased output torque and compensate for the increased time span during which the first drive torque reaches the increased output torque desired by the driver or the decreased slope of an initial torque increasing by which the first drive torque reaches the increased output torque desired by the driver when the charge condition of the energy accumulator (4) is high, such that if the increased output torque desired by the driver is increased either stepwise or abruptly, the first drive torque demanded from the first drive-power source (2) is increased with a substantially constant slope to the increased output torque desired by the driver (A to D), at a torque time gradient less than that of a maximum initial time gradient (A to C) that is deliverable by normal engine aspiration without supercharging.

7. The method according to claim 1, further comprising a step of achieving the increased output torque desired by the driver (D) in substantially a same time span ("t" at D minus "t" at A) as by normal engine aspiration without supercharging ("t" at D minus "t" at A).

* * * * *